US010027756B2

(12) United States Patent
Bolesta et al.

(10) Patent No.: US 10,027,756 B2
(45) Date of Patent: Jul. 17, 2018

(54) UNIFIED-INTERFACE FOR STORAGE PROVISIONING

(71) Applicant: CA, Inc., Islandia, NY (US)

(72) Inventors: Richard Joseph Bolesta, Shaumburg, IL (US); Michael Ralph Chiaramonte, Bellport, NY (US); Shiva Mirzadeh, Woodland Hills, CA (US); Kevin Charles Kocher, Penfield, NY (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 15/343,606

(22) Filed: Nov. 4, 2016

(65) Prior Publication Data

US 2017/0078394 A1    Mar. 16, 2017

Related U.S. Application Data

(63) Continuation of application No. 13/186,958, filed on Jul. 20, 2011.

(51) Int. Cl.
*G06F 7/00* (2006.01)
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/0607* (2013.01); *G06F 3/067* (2013.01); *G06F 3/0629* (2013.01); *G06F 3/0631* (2013.01); *G06F 3/0665* (2013.01)

(58) Field of Classification Search
USPC .................................. 707/634, 827; 709/226
See application file for complete search history.

(56) References Cited

U.S. PATENT DOCUMENTS

| 7,194,538 B1* | 3/2007 | Rabe | G06F 3/0605 |
| | | | 709/220 |
| 7,756,154 B2* | 7/2010 | Zayas | G06F 9/45512 |
| | | | 370/252 |
| 8,738,972 B1* | 5/2014 | Bakman | G06F 11/0712 |
| | | | 714/47.1 |
| 8,838,793 B1* | 9/2014 | Thrasher | H04L 63/10 |
| | | | 709/223 |

(Continued)

*Primary Examiner* — Cheyne D Ly
(74) *Attorney, Agent, or Firm* — Pillsbury Winthrop Shaw Pittman LLP (57) ABSTRACT

Systems and methods are provided for storage platform-independent storage provisioning. The systems and methods may include receiving a storage provisioning request from a user interface, processing the storage provisioning request to determine one or more of a plurality of storage resources utilized to complete the storage provisioning request, generating an instruction to provision a data storage space among the one or more of the plurality of storage resources, and provisioning the data storage space based on the instruction. Each of the plurality of storage resources may include an interface configuration, and at least two interface configurations are different from one another. Each of the plurality of storage resources may be accessible and operational in accordance with the interface configuration thereof. The processing of a storage provisioning request may include determining at least one of a nature of the storage provisioning request, or an application associated with the storage provisioning request.

18 Claims, 3 Drawing Sheets

(56) References Cited

U.S. PATENT DOCUMENTS

| | | | |
|---|---|---|---|
| 9,128,626 B2 * | 9/2015 | Chacko | G06F 3/0604 |
| 2004/0044698 A1 * | 3/2004 | Ebata | G06F 3/0608 |
| 2004/0064543 A1 | 4/2004 | Ashutosh et al. | |
| 2005/0246345 A1 | 11/2005 | Lent et al. | |
| 2007/0233868 A1 * | 10/2007 | Tyrrell | G06F 3/0605 |
| | | | 709/226 |
| 2009/0037934 A1 | 2/2009 | Sullivan | |
| 2009/0157998 A1 * | 6/2009 | Batterywala | G06F 3/0605 |
| | | | 711/171 |
| 2010/0211740 A1 | 8/2010 | Rajan et al. | |
| 2011/0066799 A1 | 3/2011 | Gold | |
| 2011/0231172 A1 | 9/2011 | Gold | |
| 2011/0276713 A1 | 11/2011 | Brand | |
| 2012/0011176 A1 | 1/2012 | Aizman | |
| 2012/0078846 A1 | 3/2012 | Gold et al. | |
| 2012/0158799 A1 | 6/2012 | Morsi et al. | |
| 2013/0191443 A1 * | 7/2013 | Gan | H04L 67/1097 |
| | | | 709/203 |

* cited by examiner

UNIFIED-INTERFACE FOR STORAGE PROVISIONING

CROSS-REFERENCE TO RELATED APPLICATIONS

The present patent is a continuation of U.S. patent application Ser. No. 13/186,958, filed 20 Jul. 2011, having the same title, the entire content of which is hereby incorporated by reference.

FIELD OF THE INVENTION

The invention generally relates to provisioning storage among heterogeneous storage resources using a storage device type-agnostic application.

BACKGROUND OF THE INVENTION

Typically, to integrate storage provisioning functionality or features into a variety of software products, such as, e.g., software products related to system management and automation, the software products have to be adapted to directly access and communicate with storage devices or resources, some of which may have unique interfacing characteristics or configurations. Accordingly, each of those software products are required to be modified to include interface modules (e.g., using custom source code) corresponding to each unique interface configuration so that the software products can interface with the storage devices for storage allocation.

However, providing such interface modules in each individual software product (or associating the interface modules with each computing device running those software products) may be very time-consuming, and in general, inefficient. Moreover, it may also be difficult and impractical for an operator or administrator to add new interface module (with additional source code) in each software product every time a new storage product with a new interface configuration is provided as a potential storage resource. As such, generally, it may be very difficult, if not impossible, to address the issue of heterogeneity of interface configurations of different types of storage devices (as each unique interface configuration may have different implementation and operational requirements), and configure storage in a consistent and uniform manner. As a result, available storage resources may not be utilized in a cost-effective and efficient manner.

Thus, it is desirable to develop and provide an improved technique for supporting heterogeneous storage devices, e.g., having disparate interface configurations, using a common interface that may access, or otherwise operate, the heterogeneous storage devices, e.g., based on their respective interface configuration.

SUMMARY

In some implementations, a system is provided for provisioning storage among heterogeneous storage devices or resources using a common interface that is configured to communicate, access and otherwise operate with various heterogeneous storage devices according to their individual interface configurations. The storage provisioning system may be communicatively coupled with various user devices and/or servers, as well as with various storage devices. In some implementations, the storage provisioning system is configured to receive (e.g., via a web service), process, and execute storage provisioning requests from one or more of the user devices and/or servers, and provision storage space(s) among the storage devices per the provisioning requests. In some implementations, the storage provisioning system provides a platform to user devices and/or servers, which is agnostic to different types and/or interface configurations of storage devices.

In some implementations, the storage provisioning system includes a two-tier framework, which may reside in or otherwise be operatively associated with a storage provisioning server. The two-tier framework may be or include a computer application (or plurality of applications capable of communicating with one another) having one or more modules thereon, which when executed, perform the storage provisioning features and functions described herein.

In some implementations, the two-tier framework includes a provisioning intelligence module (or a first tier module) and a unified-interface provisioning module (or a second tier module). The provisioning intelligence module may be functionally operational to process a storage provisioning request received from a user and/or server to determine one or more specific storage resources or devices that can be utilized to fulfill or complete the storage provisioning request. The provisioning intelligence module may determine the specific storage resources based on a nature of the storage provisioning request (e.g., new storage request, resize storage request, etc.), an application associated with the storage provisioning request and/or other factors. In some implementations, the provisioning intelligence module, after determining the specific storage resources or devices, may generate one or more instructions for the unified-interface provisioning module to provision appropriate data storage space among those specific storage devices per the storage provisioning request.

In some implementations, the unified-interface provisioning module may be configured to accept and execute one or more instructions from the provisioning intelligence module to provision the required data storage space among the storage devices as indicated in the instructions. Each of the plurality of storage resources or devices may be associated with or include an interface configuration, and at least two interface configurations may be different from one another. The unified-interface provisioning module may be adapted to operate with each storage resource in accordance with its interface configuration.

In some implementations, a method is provided for provisioning storage among heterogeneous storage resources or devices. The method may be executed by one or more processors configured to perform a plurality of operations including processing a storage provisioning request received from one or more users/servers to determine one or more of a plurality of storage resources that may be utilized to provision the storage per the request. The operations of the storage provisioning method may further include generating an instruction to provision a data storage space, wherein the instruction includes information related to (e.g., an identity) the determined one or more of the plurality of storage resources. Accordingly, based on the generated instruction, the data storage space may be provisioned among the one or more of the plurality of storage resources. In some implementations, each of the plurality of storage resources may be associated with or include an interface configuration, and at least two interface configurations may be different from one another. The processors may be adapted to operate with each storage resource in accordance with its interface configuration.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
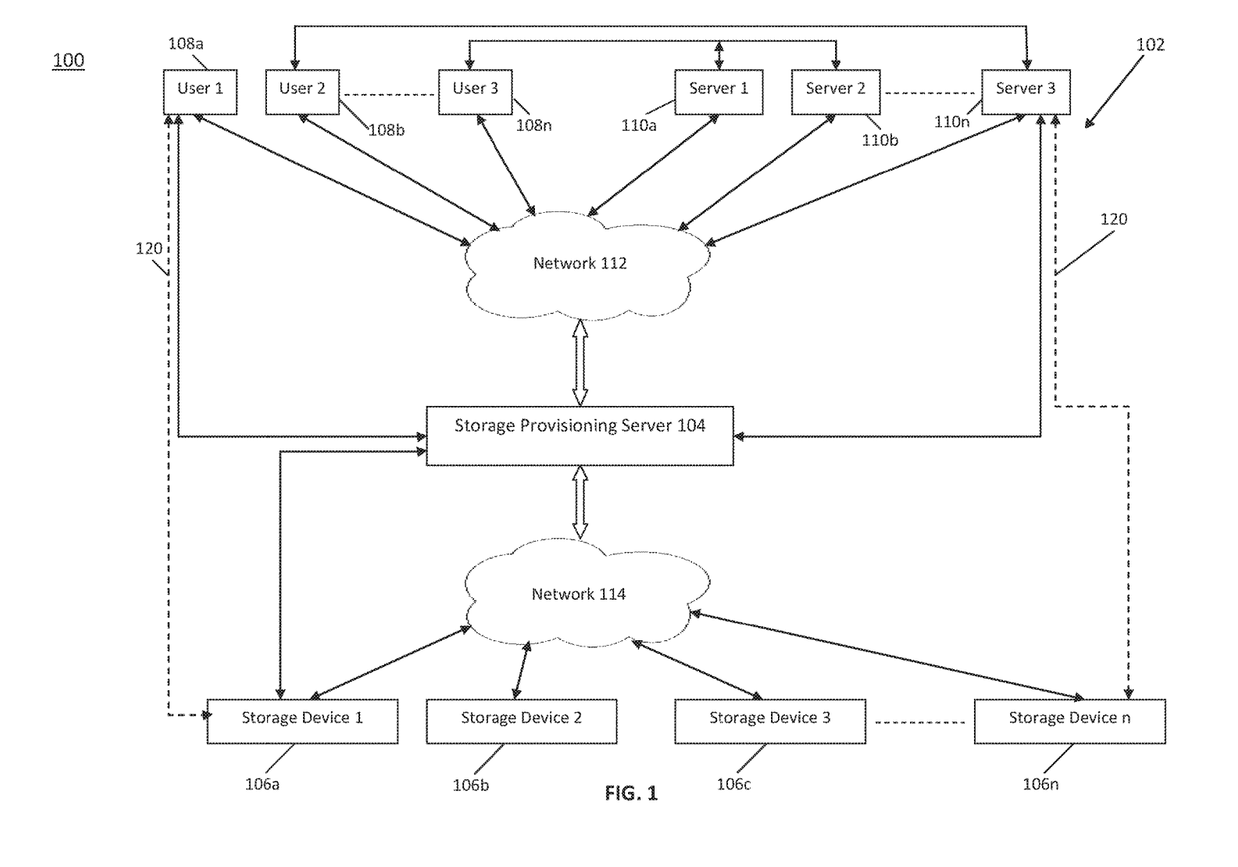
FIG. 1 illustrates an example of an environment that includes a system for performing storage provisioning, according to various implementations described in this disclosure.

In some implementations, the invention provides systems and methods for provisioning storage among heterogeneous storage devices or resources, e.g., storage devices that have disparate interface characteristics or configurations. FIG. 1 illustrates an example of an environment 100 in which an exemplary system 102 for provisioning storage resides. As shown, system 102 may include at least one storage provisioning server 104 that may be communicatively coupled to storage devices 106a-106n to provision storage spaces for user devices 108a-108n, and/or servers 110a-110n. In some implementations, storage provisioning server 104 receives storage provisioning requests from and provide provisioned storage to user devices 108a-108n, and/or servers 110a-110n. In some implementations, storage provisioning server 104 includes a storage provisioning application that when executed performs one or more functions related to provisioning storage among storage devices 106a-106n (as described in detail below). The storage provisioning application (on server 104) may be accessible to, or in general, communicatively associated with user devices 108a-108n, and/or servers 110a-110n via application program interfaces (APIs) or web services interfaces. In some implementations, environment 100 may include one or more elements (not shown) other than those mentioned above.

Generally, storage provisioning may be defined as a process of allocating, configuring and exporting storage from one or more storage resources (e.g., storage devices 106a-106n) to satisfy storage requirements of specific applications executing on user devices (e.g., devices 108a-108n) and/or servers (e.g., servers 110a-110n). For example, storage provisioning may include provisioning or providing additional new storage space from storage devices 106a-106n to a requesting user device 108 or server 110. Additionally, or alternatively, storage provisioning may include resizing or reconfiguring the amount of storage already allocated to a user device 108 or server 110, or reconfiguring the existing mapping between one or more user devices 108a-108n/server 110a-110n and one or more storage devices 106a-106n.

User devices 108a-108n, and/or servers 110a-110n may be connected to storage provisioning server 104 directly or via network 112. Further, storage provisioning server 104 may be connected with storage devices 106a-106n directly or via network 114. Although only one storage provisioning server 104 is shown in FIG. 1, this is for illustrative purposes only. In some implementations, there may be a plurality of storage provisioning servers 104 connected directly or via one or more networks (e.g., networks 112, 114) or otherwise connected to one another.

Networks 112, 114 may any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection. One or more security technologies may be used to ensure the security of information across all parts of the system, where necessary. For example Secure Socket Layer (SSL) protocol and bank level SSL may be utilized to ensure the authenticity and security of messages passed across the network. In some implementations, networks 112, 114 are implemented using fiber channels. It will be appreciated that this is not intended to be limiting, and that the scope of this disclosure includes implementations in which storage provisioning server 104, storage devices 106a-106n, user devices 108a-108n, and/or servers 110a-110n are operatively linked via some other communication methodology, e.g., via a direct wired or wireless connection.

In some implementations, user devices 108a-108n and/or servers 110a-110n each may include a processor, circuitry, and/or other hardware components (not shown) operable to execute computer-readable instructions to perform functions described herein. User devices 108a-108n may be stand-alone computing devices, e.g., laptops, desktops, or wireless devices (e.g., smartphones, personal digital assistants, etc.) operated by an end user. User devices 108a-108n (or end users operating those devices) may be a part of one or more organization, and as such may be identified using certain identification information such as, e.g., department number, employee number, etc. In some embodiments, users/operators of user devices 108a-108n may submit their request for additional or modified storage space at their respective devices to storage provisioning server 104, e.g., via a web services interface. Alternatively, user devices 108a-108n may be operatively coupled with and/or controlled by one or more servers 110a-110n, such that servers 110a-110n may monitor, handle and submit (static or dynamic) storage requests for devices 108a-108n to storage provisioning server 104. In some implementations, servers 110a-110n may be (physical and/or virtual) application servers running one or more applications related to, e.g., system management, system automation, etc. The applications running on servers 110a-110n each may require a certain amount of storage space for proper functioning as desired.

Accordingly, in some implementations, a storage provisioning request (from device 108 or server 110) may include one or more of a request for additional storage space, request to resize (e.g., increase or decrease the amount) of already-assigned storage space, or request to modify the mapping between user devices 108/servers 110 and storage devices 106. For example, a user operating one of devices 108a-108n or an administrator operating one of servers 110a-110n may determine that additional and/or modified storage space is needed for their respective computing devices for the device to adequately continue its operations. Based on such determination, the user/administrator may generate an "on-demand" storage provisioning request indicating one or more parameters such as, for example, amount of additional storage space that is needed, the type of application(s) for which the storage space may be needed, whether it is one-time request or a recurring request, a particular time and/or date when the additional storage space is needed, and/or other parameters. In some implementations, a user of devices 106 and/or servers 110 may access a web service (e.g., via network 112 or other networks) using a graphical user interface available on the user's device 106/server 110 to provide details/parameters relating to the storage provisioning request to storage provisioning server 104.

Further, in some implementations, the storage provisioning process may be a part of, or otherwise associated with, a system management and automation application implemented, e.g., in one or more of servers 110a-110n. The management and automation application may include processes related to monitoring performance data (e.g., in terms of dynamic load) of user devices 108a-108n or other devices. Based on certain predetermined criteria for the monitored performance data (e.g., if the dynamic load is greater than a certain threshold value), the management and automation application may generate an "automation" storage provisioning request indicating, e.g., requirement for additional storage space for one or more system devices (e.g., user devices 108a-108n) in one or more storage devices 106a-106n. Additionally, or alternatively, the management and automation application may generate an automation storage provisioning request in accordance with certain predefined policies. For example, storage provisioning policies (and thus, automation storage provisioning requests) may be based on factors, such as, but not limited to, Quality of Service (QoS) requirements related to storage services, requirements of the applications executing on user devices 108/servers 110, and/or collective dynamic availability of storage in devices 106a-106n. For example, an automation storage provisioning request may be generated based on a policy to allocate or change a certain amount of storage space (e.g., above or below a certain threshold) for a group of users or applications, or based on a specific time of the day, etc. In some implementations, like the on-demand request, an automation storage provisioning request may be sent from one or more of servers 110a-110n to storage provisioning server 104 via a web service. In some implementations, on-demand and/or automation storage provisioning requests sent from user devices 108 and/or servers 110 may not include (or even indicate) any information related to a specific type of storage device 106 or interface characteristic thereof.

It should be appreciated that although storage provisioning server 104 is shown as a server separate from servers 110a-110n, storage provisioning server 104 or a storage provisioning application installed thereon may be implemented with its partial or full functionality as part of one or more servers 110a-110n. As such, the storage provisioning features provided by server 104 or the associated storage provisioning application may be fully or partially integrated with the functionalities and/or services (e.g., system management and automation, etc.) provided by applications of servers 110a-110n.

In some implementations, storage resources or devices 106a-106n include various physical and/or virtual storage resources based on storage products, systems and/or solutions provided by various vendors/manufacturers. For example, storage resources or devices 106a-106n may be provided by one or more of EMC Corporation of Hopkinton, Mass. ("EMC storage"), NetApp, Inc. of Sunnyvale, Calif. ("NetApp storage"), or Hewlett-Packard Company of Palo Alto, Calif. ("HP storage"). Alternatively, or additionally, storage devices 106a-106n may include tape drives, disk arrays, optical storage media, etc., provided by other manufacturers, that electronically store information. In some implementations, at least two of storage devices 106a-106n have or are associated with respective interface configurations or characteristics that are different from one another. For example, using its specific interface configuration, one of the at least two storage devices 106a-106n may interface and exchange information (directly or via networks 112, 114) with storage provisioning server 104 and/or devices 108a-108n/servers 110a-110n in a manner that may be different than the interface configuration of the other of the at least two storage devices 106a-106n. In some implementations, interface characteristics or configurations of storage devices from different manufacturers may be different, e.g., EMC storage, NetApp storage and HP storage may have disparate interface configurations. In some implementations, as discussed in detail below, storage provisioning server 104 is adapted to interface and exchange information with each of storage devices 106a-106n (of which two or more have different interface configurations) in accordance with the interface configuration of that particular storage device 106. Accordingly, storage provisioning server 104 may provide a uniform and storage manufacturer-agnostic platform for user devices 108a-108n and/or servers 110a-110n that may require (on-demand or automated) additional or modified storage space.

Figure 2:
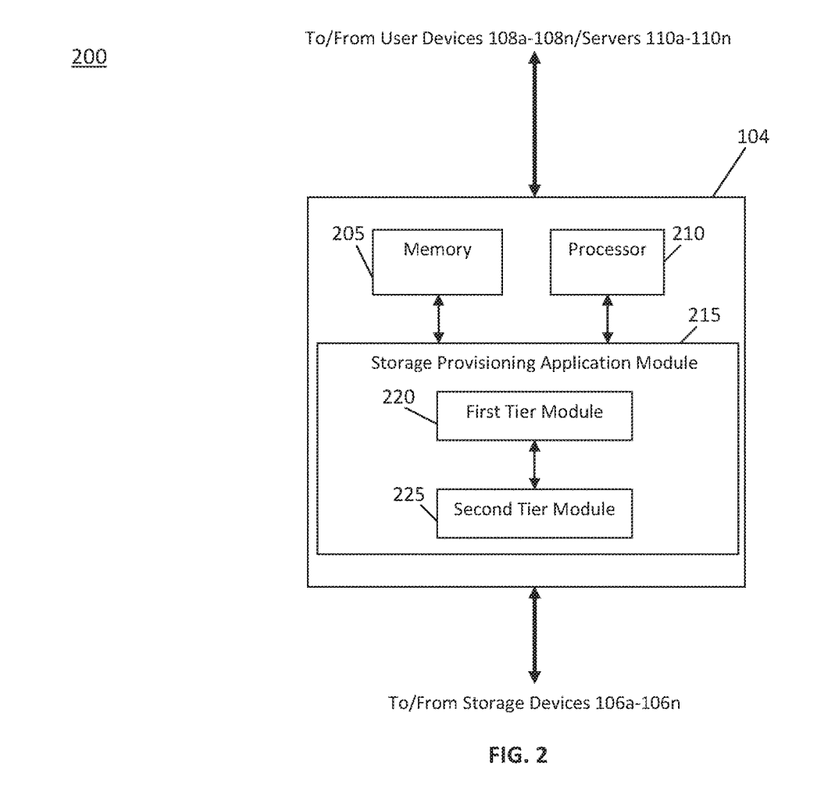
FIG. 2 illustrates an exemplary storage provisioning server, according to various implementations described in this disclosure.

FIG. 2 illustrates a block diagram 200 which illustrates an example of storage provisioning server 104 according to some implementations. For example, as shown, storage provisioning server 104 may include a memory 205. Although memory 205 is depicted as a single unit in server 104, they may be two or more memories or other storage units. Memory 205 may comprise electronic storage media that electronically stores information. Such electronic storage media may be provided integrally (i.e., substantially non-removable) to storage provisioning server 104 and/or as removable storage that is removably connectable to storage provisioning server 104 via, for example, a port (e.g., a USB port, a FireWire port, etc.) or a drive (e.g., a disk drive, etc.). Memory 205 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 205 may store requests, reports and other information related to and that enables storage provisioning by storage provisioning server 104 of storage devices 106a-106n for devices 108a-108n and/or servers 110a-110n.

In some implementations, storage provisioning server 104 includes a processor 210 that may be configured to provide information processing capabilities in server 104. As such, processor 210 may include one or more of a digital processor, an analog processor, a digital circuit designed to process information, an analog circuit designed to process information, a state machine, and/or other mechanisms for electronically processing information. Although processor 210 is shown in FIG. 2 as a single entity, this is for illustrative purposes only. In some implementations, processor 210 may include a plurality of processing units. These processing units may be physically located within the same device or computing platform, or processor 210 may represent processing functionality of a plurality of devices operating in coordination.

In some implementations, storage provisioning server 104 may run or operate a storage provisioning application 215 for a storage provisioning process. Storage provisioning application 215 may be or may include a computer application (or plurality of applications capable of communicating with one another) having one or more modules for performing the features and functions described herein, such as, for example, a first tier module (or intelligence module) 220 and a second tier module (or a unified-interface provisioning module) 225. In some implementations, the modules of storage provisioning application 215 may include computer executable instructions embodied on computer readable storage media, e.g., memory 205. These computer executable instructions may be used to configure, e.g., processor 210 of storage provisioning server 104 for performing one or more features and functions, including those disclosed herein and/or other features and functions. In some implementations, storage provisioning application 215 modules may be implemented across multiple applications and/or devices (e.g., servers 110a-110n or other servers) within environment 100 to perform the storage provisioning features and functions described herein.

In operation, storage provisioning server 104 and/or storage provisioning application 215 is configured to receive (e.g., via a web service or other interfaces), process and execute storage provisioning requests (e.g., on-demand and/or automation requests) from user devices 108a-108n and/or servers 110a-110n. In some implementations, storage provisioning server 104 and/or storage provisioning application 215 are configured to provide a platform to devices 108/servers 110 which is agnostic to different types of storage devices (e.g., EMC storage, NetApp storage, etc.) and specifically, to different types of interface configurations for the storage devices required to access and configure them. As such, storage provisioning requests sent from user devices 108 and/or servers 110 may not include (or even indicate) any information related to a specific type of storage device 106 or interface characteristic thereof.

In some implementations, storage provisioning requests received at server 104 may first be stored in memory 205, and subsequently passed on to storage provisioning application 215 for further processing. In some implementations, as part of application 215, first tier module 220 is configured to process storage provisioning requests to determine one or more specific storage devices 106a-106n that can be utilized to fulfill each request. The processing of each storage provisioning request at first tier module 220 may include considering one or more factors or parameters of the request, such as, for example, nature of the request (e.g., storage addition, resizing, etc.), application(s) for which the storage is to be provisioned, storage cost, failover policies, backup policies, speed of accessing storage, priority of the requesting user device 108/server 110, and/or other factors/parameters.

For example, a storage provisioning request received from a user device 108 may indicate that a new storage space is needed at the user device 108 for software production. As such, first tier module 220 may process the request and determine that, since the request is related to software production, a storage resource (e.g., from storage devices 106a-106n) that is relatively fast, reliable and/or scalable may be provisioned to best serve the request. Accordingly, based on performance and other data (e.g., stored in memory 205 and/or other memories) related to storage devices 106a-106n, first tier module 220 may select one or more specific storage devices 106a-106n that meet the speed, reliability and/or scalability criteria to appropriately fulfill the storage request. Similarly, as another example, a storage provisioning request may indicate storage space at a user device 108/server 110 needs to be resized for a product testing application. Accordingly, first tier module 220 may determine that for a resizing request and/or for a testing application, a storage resource that is relatively slower and/or cheaper can be provisioned for the requesting device 108/server 110, and thus, may accordingly choose one or more specific storage devices 106a-106n. The specific storage devices 106a-106n chosen by first tier module 220 may be from a same manufacturer/vendor or different manufacturer/vendor, or may have same or disparate interface configurations.

In some implementations, based on the request processing and after deciding on the specific storage devices 106a-106n, first tier module 220 is further configured to generate and send one or more instructions or calls to second tier module 225 to provision storage in those specific storage devices 106a-106n. Appropriate functions in second tier module 225 that may be called upon to provision the storage include, but not limited to, storage provisioning, storage attaching, storage resizing, and storage deleting. Such functions of second tier module 225 may be called by first tier module 220 in a predetermined order of execution. For example, first tier module 220 may send instructions or calls to execute the storage provisioning function prior to sending instructions or call to execute the storage attaching function.

In some implementations, second tier module 225 is configured to accept instructions from first tier module 220 to provision required storage in the one or more storage devices 106a-106n chosen by first tier module 220. Second tier module 225 may provide a unified interface across all heterogeneous storage devices 106a-106n having disparate interface configurations. In other words, second tier module 225 may provide an adaptation layer through which storage provisioning (e.g., per instructions from first tier module 220) can be achieved regardless of the vendor, type or interface characteristics of the storage device. As such, using the unified and storage device-agnostic functionality of second tier module 225, there may no need to configure and/or have a separate interface module to access and provision each type of available storage device 106. In some implementations, second tier module 225 include software modules 226a-226n corresponding to at least one of the unique interface configurations of storage devices 106a-106n. For example, in a non-limiting implementation, software module 226a may be configured to interface with (and as such, be operational with) one or more EMC storage devices (among devices 106a-106n); software module 226b may be configured to interface with one or more HP storage devices; software module 226c may be configured to interface with one or more NetApp storage devices; and other software modules 226d-226n may be configured to interface with the rest of storage devices 106. Accordingly, second tier module 225 communicates (e.g., via network 114), accesses and provisions each of the specific storage devices 106a-106n (per instructions from first tier module 220) using one of the modules 226a-226n that corresponds to that particular storage device's interface configuration.

In some implementations, after processing and acting upon the storage provisioning request, second tier module 225 is configured to generate a status report, e.g., indicating the result of the operations in accordance with the request, and send the status report to first tier module 220. The status report may indicate if the requested storage was successfully provisioned in one or more storage devices 106a-106n, and if yes, the status report may include location, path or, an identity (e.g., MAC address, IP address, etc.) of the provisioned storage device 106. However, if second tier module 225 was not able to provision storage as requested, the status report may indicate failure of the storage provisioning process, and the status report may include details on why the storage provisioning failed and how it can be corrected. Upon receipt of the status report, first tier module 220 may further communicate the report (as is or in a reformatted form) to requesting user device 108 and/or server 110.

In some implementations, once the storage is successfully provisioned by application 215, requesting user device 108 and/or server 110 may be operatively connected with the provisioned storage device 106 either directly (as illustrated by labels 120), or through one or both of networks 112, 114 or other network(s). Such connection or communication path between requesting user device 108 and/or server 110, and provisioned storage device 106 may not include any processing by or connection through storage provisioning server 104.

It should be appreciated that although modules 220, 225 are illustrated in FIG. 2 as being co-located with a single processing unit, in implementations in which processor 210 includes multiple processing units, one or both of modules 220, 225 may be located remotely from the other modules or components of server 104. However, in some implementations, remote modules 220, 225 are configured to communicate and be functional with each other as well as with other modules or components of server 104. The description of the functionality provided by the different modules, i.e., modules 220, 225 described below is for illustrative purposes, and is not intended to be limiting, as any of modules 220, 225 may provide more or less functionality than is described. For example, one or more of modules 220, 225 may be optional or eliminated, and some or all of its functionality may be provided by other ones of modules 220, 225. As another example, processor 210 may be configured to execute one or more additional modules that may perform some or all of the functionality attributed below to one of modules 220, 225.

Figure 3:
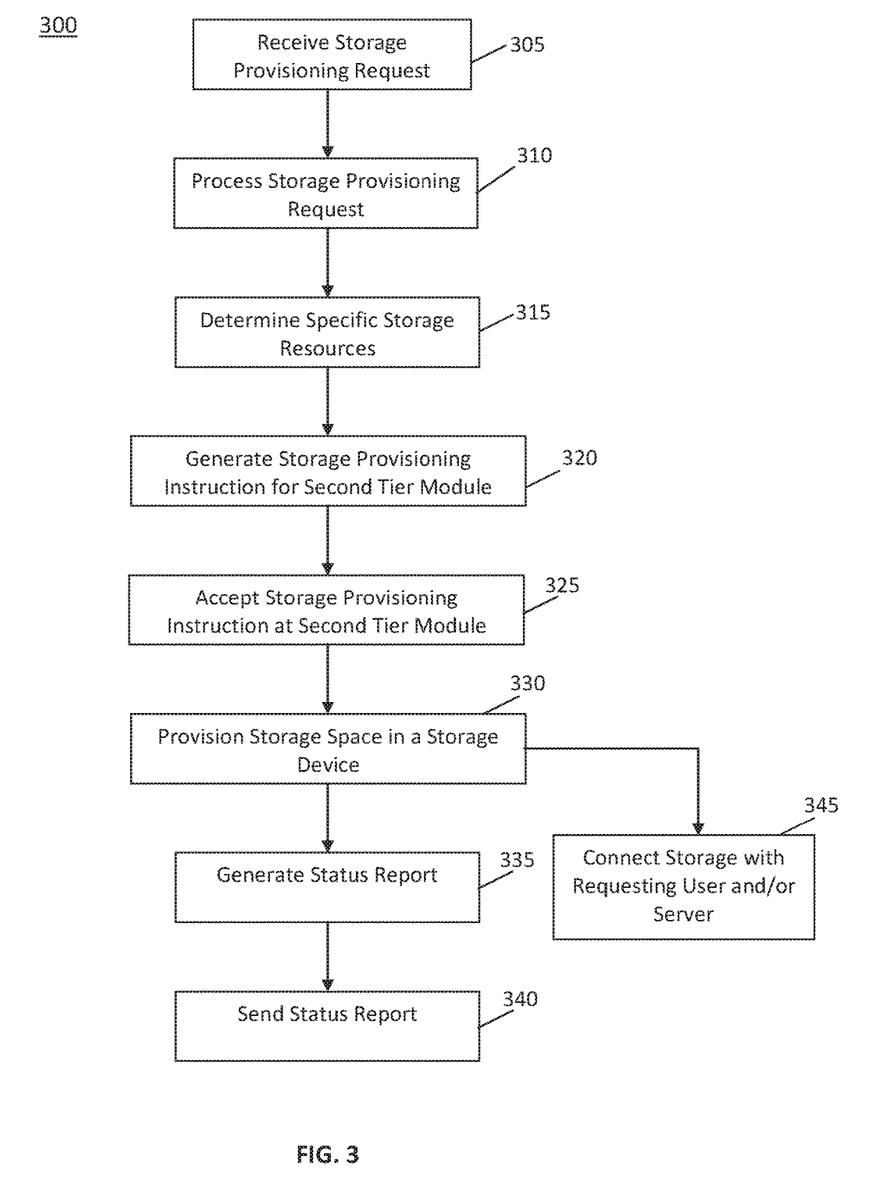
FIG. 3 illustrates an example of instruction flow between various components for storage provisioning, according to various implementations described in this disclosure.

FIG. 3 illustrates a process 300, which is an example of a storage provisioning process performed using, or otherwise associated with, storage provisioning server 104 and/or storage provisioning application 215. In some implementations, process 300 may be performed by one or more processors (e.g., processor 210).

Process 300 includes an operation 305, wherein a storage provisioning request from a user 108 and/or server 110 is received at storage provisioning server 104. In operation 310, the storage provisioning request is processed by first tier module 220 to determine one or more specific storage resources or devices 106a-106n that can be utilized to complete the storage provisioning request. In some implementations, first tier module 220 determines, in operation 315, the specific storage resources based on at least one of a nature of the storage provisioning request (e.g., new storage request, resize storage request, etc.), or an application associated with the storage provisioning request. In operation 320, first tier module 220, after determining the specific storage resources or devices, may generate one or more instructions for second tier module 225 to provision appropriate data storage space among those specific storage devices.

In operations 325 and 330, second tier module 225, which may be configured to uniformly communicate and access heterogeneous storage devices 106a-106n regardless of their disparate interface configurations, accepts and executes instructions from first tier module 220 to provision the required data storage space among the specified storage devices, e.g., using modules 226a-226n. In operation 335, second tier module 225 may generate a status report related to the provisioning of the data storage space by second tier module 225, and in operation 340, second tier module 225 may send the status report to first tier module 220. In operation 345, after storage is provisioned among appropriate storage devices 106, the provisioned storage devices 106 are directly connected and become accessible/operational with the requesting user 108 and/or server 110.

Implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that one skilled in the art may be able to effect such feature, structure, or characteristic in connection with other aspects or implementations, whether or not explicitly described. Thus, various changes and modifications may be made to the provided description without departing from the scope or spirit of the invention. As such, the specification and drawings should be regarded as exemplary only, and the scope of the invention determined solely by the appended claims.

What is claimed is:

1. A method of provisioning network-attached storage, the method comprising:
 receiving, with one or more processors, via a network, a storage provisioning request from a requesting computing device,
  wherein the request specifies that storage is to be added and indicates an application for which the storage is to be provisioned, and
  wherein the request does not indicate which storage device is to be used to satisfy the request;
 after receiving the storage provisioning request, selecting, with one or more processors, a storage device from among a plurality of storage devices accessible via the network based on the application for which the storage is to be provisioned,
  wherein the plurality of storage devices include storage devices having different interface configurations by which the respective storage devices are remotely commanded to provision storage;

instructing, with one or more processors, a module configured to provide a unified interface to provision storage in the selected storage device for the requesting computing device,
  wherein the instruction is provided to the unified interface, and
  wherein the unified interface provides a consistent interface across heterogeneous storage devices having disparate interface configurations;
adapting, with one or more processors instantiating the module, the instruction to an interface configuration of the selected storage device;
receiving, with one or more processors, via the network, a report indicating that the storage was successfully provisioned by the selected storage device, the report indicating an address of the provisioned storage; and
sending, with one or more processors, via the network, to the requesting computing device, the address of the provisioned storage, wherein:
  the requesting computing device comprises a server hosting production software;
  the storage provisioning request comprises an automated provisioning request specifying that the application is production software;
  selecting the storage device comprises selecting first and second storage devices in response to the automated provisioning request,
  the first and second storage devices are selected based on both:
    differences in speed of access of the first and second storage devices relative to other storage devices among the plurality of storage devices, and
    failover policies of the first and second storage devices;
  the first and second storage devices have different interface configurations and are made by different vendors from one another;
  instructing the module comprises instructing the module via the unified interface to provision storage on the first and second storage devices;
  adapting the instruction comprises adapting the instruction with two different software modules configured to interface with the first and second storage devices respectively; and
  receiving the report comprises receiving a first status report from the first storage device and a second status report from the second storage device, the first status report and the second status report each indicating storage is successfully provisioned and a network address of a respective storage device on the network.

2. The method of claim 1, wherein:
the requesting computing device comprises a server;
the request is an automated request;
the application for which the storage is to be provisioned is production software; and
the plurality of storage devices comprise a first storage device and a second storage device, wherein the first storage device is faster than the second storage device in speed of access to stored data; and
selecting the storage device comprises selecting the first storage device based on both the first storage device being faster than the second storage device and the application for which the storage is to be provisioned being production software.

3. The method of claim 1, wherein:
the requesting computing device is a user computing device;
the request is received via a web service user interface;
the application for which the storage is to be provisioned is executed on the user computing device;
the plurality of storage devices comprise a first storage device and a second storage device, wherein the first storage device is faster than the second storage device in speed of access to stored data; and
selecting the storage device comprises selecting the second storage device based on both the first storage device being faster than the second storage device and the application for which the storage is to be provisioned being executed on a user computing device.

4. The method of claim 1, wherein:
the application for which the storage is to be provisioned is a product testing application; and
the plurality of storage devices comprise a first storage device and a second storage device, wherein the first storage device is faster than the second storage device in speed of access to stored data; and
selecting the storage device comprises selecting the second storage device based on both the first storage device being faster than the second storage device and the application for which the storage is to be provisioned being a product testing application.

5. The method of claim 1, wherein:
selecting the storage device comprises:
  obtaining for each of at least some of the plurality of storage devices:
    a respective failover policy,
    a respective backup policy, and
    a respective speed of access; and
  selecting one of the plurality of storage devices based on the respective failover policy, respective backup policy, and respective speed of access of the at least some of the plurality of storage devices.

6. The method of claim 1, comprising:
obtaining a priority of the requesting computing device, wherein selecting the storage device comprises selecting among the plurality of storage devices based on both the priority of the requesting computing device and the application for which the storage is to be provisioned.

7. The method of claim 1, wherein:
selecting the storage device comprises selecting a plurality of storage devices based on storage device performance.

8. The method of claim 7, wherein:
the selected plurality of storage devices comprises:
  a first storage device having a first interface configuration;
  a second storage device having a second interface configuration that is different from the first interface configuration;
adapting the instruction comprises:
  interfacing with the first storage device with a first software module to provision at least some requested storage;
  interfacing with the second storage device with a second software module to provision at least some requested storage, the second software module being a different software module from the first software module.

9. The method of claim 1, comprising:
receiving, with the selected storage device, data to be stored from the requesting computing device; and
storing the received data with the selected storage device.

10. A system, comprising:
one or more processors; and
memory storing instructions that when executed by at least some of the processors effectuate operations comprising:
receiving, via a network, a storage provisioning request from a requesting computing device,
wherein the request specifies that storage is to be added and indicates an application for which the storage is to be provisioned, and
wherein the request does not indicate which storage device is to be used to satisfy the request;
after receiving the storage provisioning request, selecting a storage device from among a plurality of storage devices accessible via the network based on the application for which the storage is to be provisioned,
wherein the plurality of storage devices include storage devices having different interface configurations by which the respective storage devices are remotely configured to provision storage;
instructing a module configured to provide a unified interface to provision storage in the selected storage device to the requesting computing device,
wherein the instruction is provided to the unified interface, and
wherein the unified interface provides a consistent interface across heterogeneous storage devices having disparate interface configurations;
adapting, with the module, the instruction to an interface configuration of the selected storage device;
receiving, via the network, a report indicating that the storage was successfully provisioned by the selected storage device, the report indicating an address of the provisioned storage; and
sending, via the network, to the requesting computing device, the address of the provisioned storage,
wherein:
the requesting computing device comprises a server hosting production software;
the storage provisioning request comprises an automated provisioning request specifying that the application is production software;
selecting the storage device comprises selecting first and second storage devices in response to the automated provisioning request,
the first and second storage devices are selected based on both:
differences in speed of access of the first and second storage devices relative to other storage devices among the plurality of storage devices, and
failover policies of the first and second storage devices;
the first and second storage devices have different interface configurations and are made by different vendors from one another;
instructing the module comprises instructing the module via the unified interface to provision storage on the first and second storage devices;
adapting the instruction comprises adapting the instruction with two different software modules configured to interface with the first and second storage devices respectively; and
receiving the report comprises receiving a first status report from the first storage device and a second status report from the second storage device, the first status report and the second status report each indicating storage is successfully provisioned and a network address of a respective storage device on the network.

11. The system of claim 10, wherein:
the requesting computing device comprises a server;
the request is an automated request;
the application for which the storage is to be provisioned is production software; and
the plurality of storage devices comprise a first storage device and a second storage device, wherein the first storage device is faster than the second storage device in speed of access to stored data; and
selecting the storage device comprises selecting the first storage device based on both the first storage device being faster than the second storage device and the application for which the storage is to be provisioned being production software.

12. The system of claim 10, wherein:
the requesting computing device is a user computing device;
the request is received via a web service user interface;
the application for which the storage is to be provisioned is executed on the user computing device;
the plurality of storage devices comprise a first storage device and a second storage device, wherein the first storage device is faster than the second storage device in speed of access; and
selecting the storage device comprises selecting the second storage device based on both the first storage device being faster than the second storage device and the application for which the storage is to be provisioned being executed on a user computing device.

13. The system of claim 10, wherein:
the application for which the storage is to be provisioned is a product testing application; and
the plurality of storage devices comprise a first storage device and a second storage device, wherein the first storage device is faster than the second storage device in speed of access; and
selecting the storage device comprises selecting the second storage device based on both the first storage device being faster than the second storage device and the application for which the storage is to be provisioned being a product testing application.

14. The system of claim 10, wherein:
selecting the storage device comprises:
obtaining for each of at least some of the plurality of storage devices:
a respective failover policy,
a respective backup policy, and
a respective speed of access; and
selecting one of the plurality of storage devices based on the respective failover policy, respective backup policy, and respective speed of access of the at least some of the plurality of storage devices.

15. The system of claim 10, the operations comprising:
obtaining a priority of the requesting computing device,
wherein selecting the storage device comprises selecting among the plurality of storage devices based on both the priority of the requesting computing device and the application for which the storage is to be provisioned.

16. The system of claim 10, wherein:
selecting the storage device comprises selecting a plurality of storage devices based on storage device performance.

17. The system of claim 16, wherein:
the selected plurality of storage devices comprises:
- a first storage device having a first interface configuration;
- a second storage device having a second interface configuration that is different from the first interface configuration;

adapting the instruction comprises:
- interfacing with the first storage device with a first software module to provision at least some requested storage;
- interfacing with the second storage device with a second software module to provision at least some requested storage, the second software module being a different software module from the first software module.

18. The system of claim 10, comprising:
at least some of the plurality of storage devices;
means for processing storage provisioning requests to determine one or more specific storage devices; and
means for accepting instructions to provision required storage.

\* \* \* \* \*